Aug. 23, 1966 M. C. HEMSWORTH ET AL 3,267,673
RECUPERATOR FOR GAS TURBINE POWERPLANTS
Original Filed July 13, 1964 3 Sheets-Sheet 1
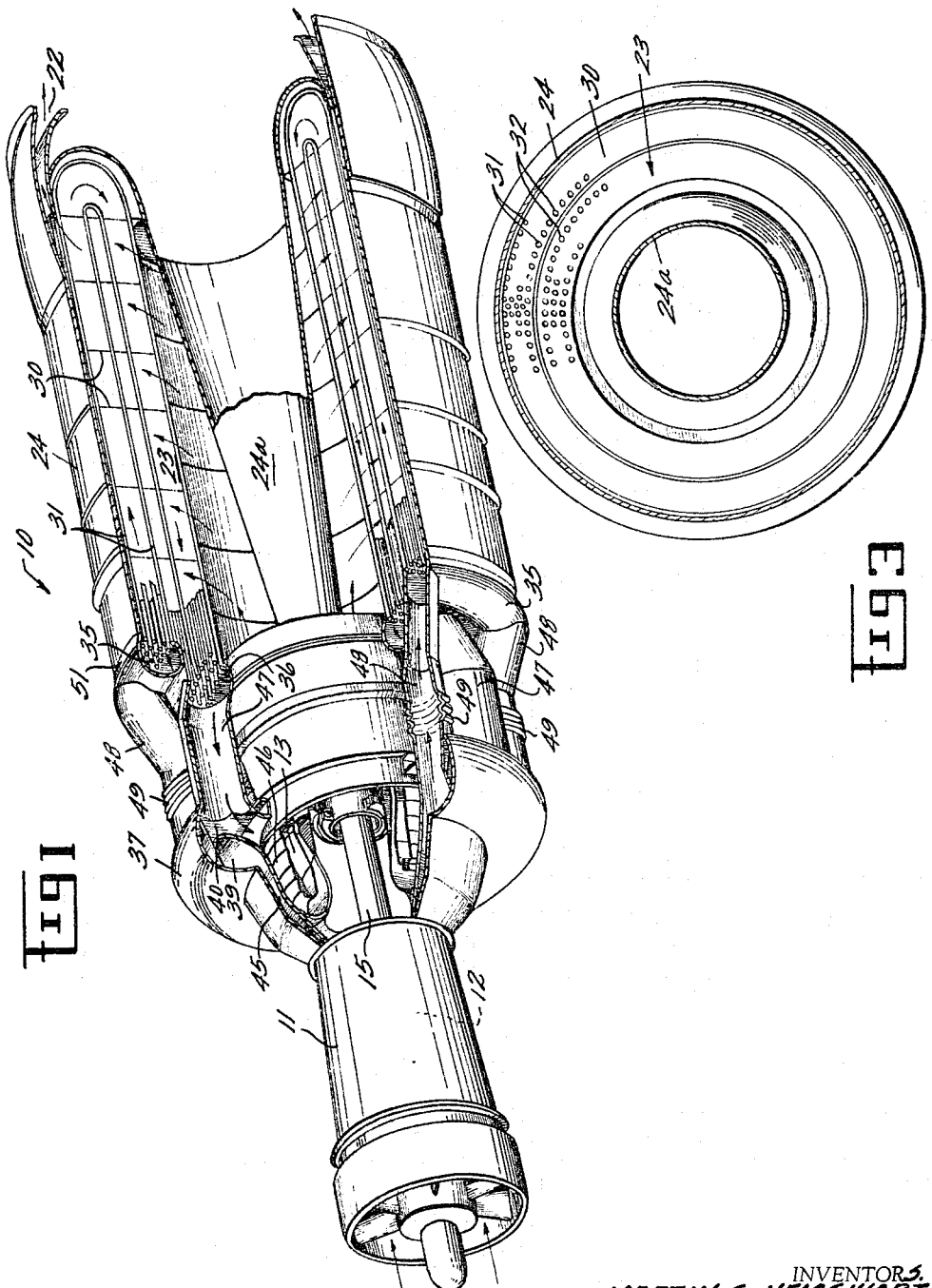
INVENTORS.
MARTIN C. HEMSWORTH
TED F. STIRGWOLT
BY
George R. Powell
ATTORNEY

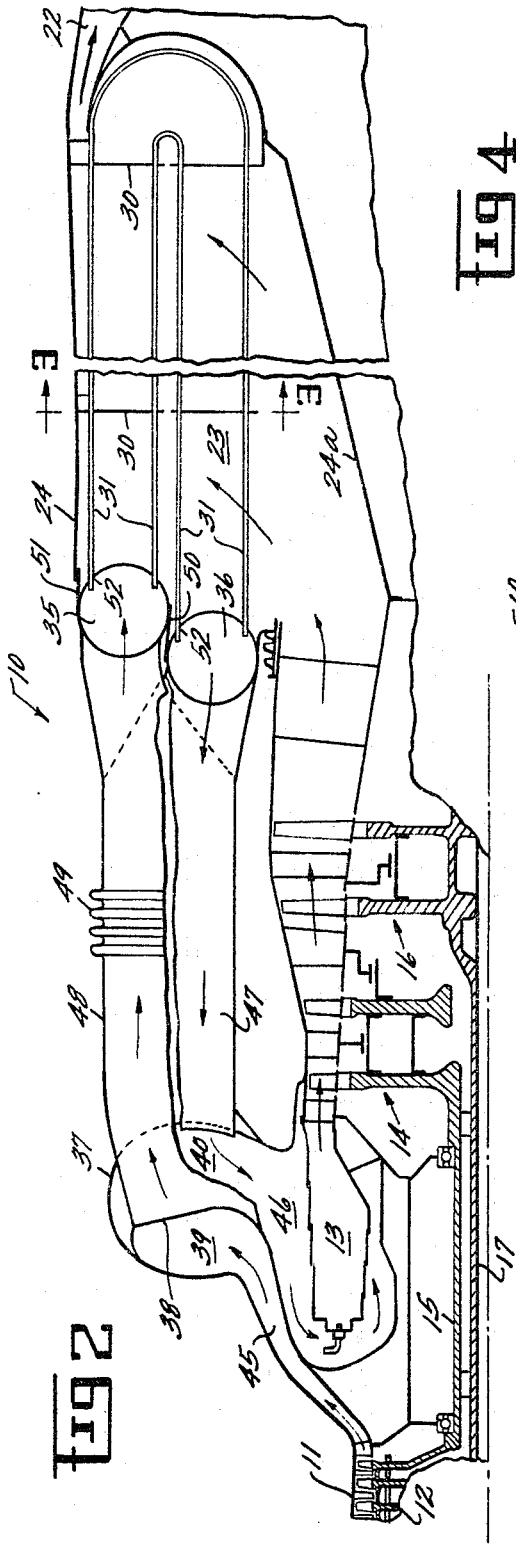
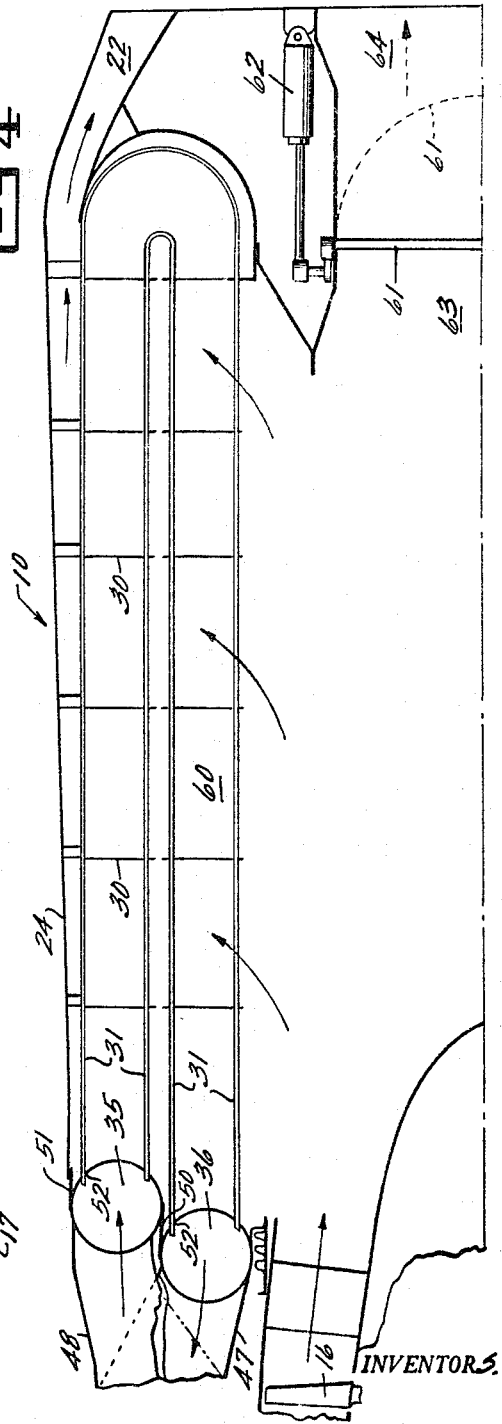

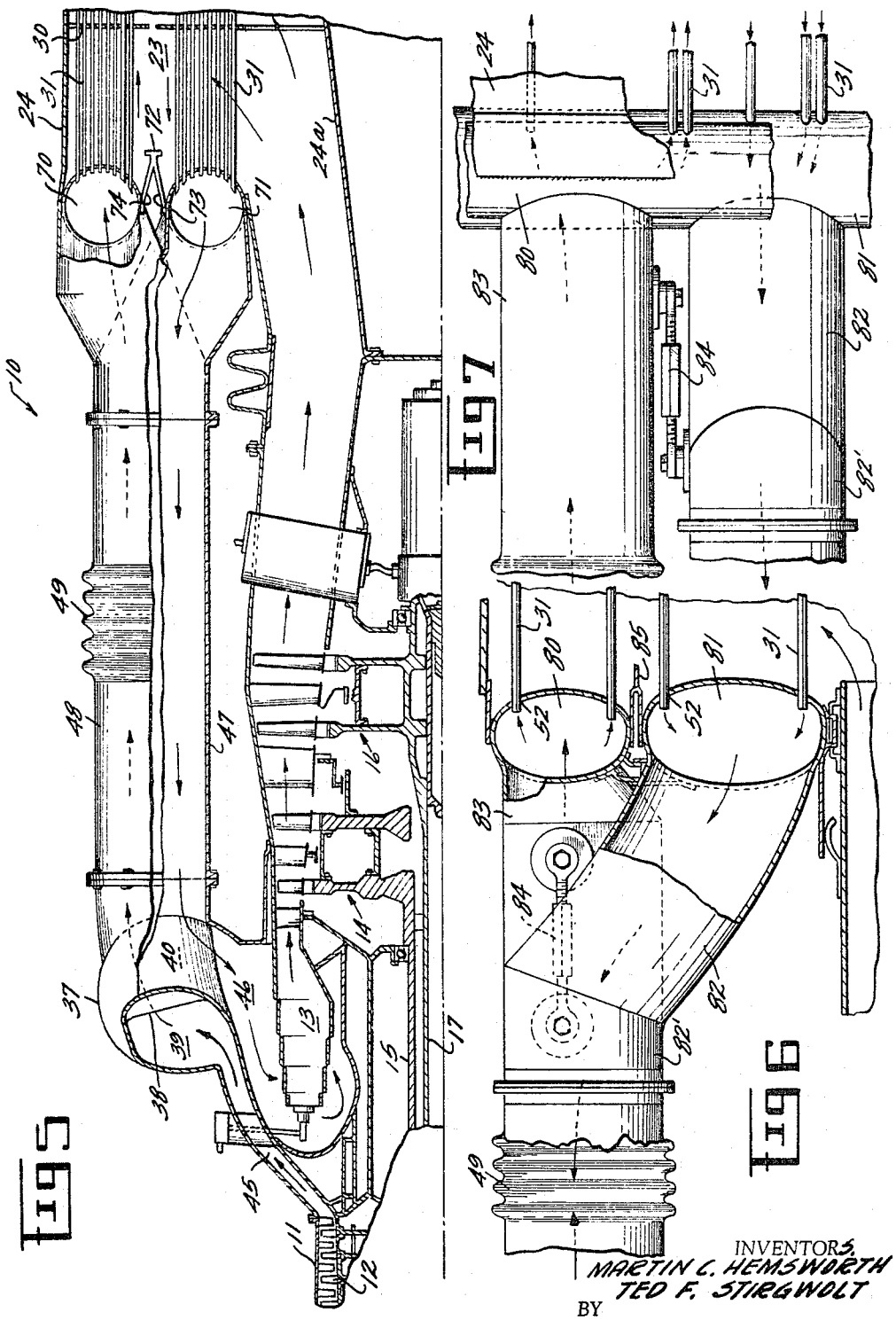

United States Patent Office 3,267,673
Patented August 23, 1966

3,267,673
RECUPERATOR FOR GAS TURBINE
POWERPLANTS
Martin Carl Hemsworth, Cincinnati, Ohio, and Ted Floyd Stirgwolt, Manchester, Mass., assignors to General Electric Company, a corporation of New York
Continuation of application Ser. No. 382,046, July 13, 1964. This application Oct. 22, 1965, Ser. No. 513,610
12 Claims. (Cl. 60—39.51)

This application is a continuation of applicants' copending application entitled, "Recuperative Arrangement for Gas Turbine Powerplants," Serial No. 382,046, filed July 13, 1964, and assigned to the assignee of this invention.

This invention relates to a recuperative arrangement for gas turbine engines and, more particularly, to a structural arrangement for a recuperator which is relatively lightweight and substantially free of thermal stresses.

Gas turbine powerplants have been provided with recuperators in the past in order to recover thermal energy and thereby reduce fuel consumption. A recuperator is a heat exchanger through which exhaust fluid from the turbine is directed prior to being discharged from the powerplant, the exhaust fluid being passed in heat exchange relationship with compressor discharge fluid which is directed through the recuperator prior to being supplied to the powerplant combustor. As a result of the heat exchange process, the compressed fluid is heated and supplied to the combustor at a higher temperature and the exhaust fluid is cooled. The net effect of the process is to increase the overall thermal efficiency of the powerplant since less fuel is required to produce a given turbine inlet temperature.

The elements of a recuperator are subjected to wide temperature variations. When the powerplant is not operating, the various elements are at a relatively low uniform ambient temperature. During powerplant operation, different elements are subjected to different temperatures, and some elements are even exposed to fluids at widely varying temperatures, the natural tendency of the elements being to expand and contract in response to temperature changes. The usual practice, however, has been to interconnect the various elements such that a substantially rigid structure is formed. Consequently, individual elements normally have little freedom to expand and contract in response to temperature changes, and rigidly interconnected elements may even tend to expand and contract in opposition to each other. With normal thermal expansion and contraction thus restrained, the elements of the recuperator are subjected to undesirable thermal stresses. In time, these stresses may cause damage to, or even failure of, the recuperator. For example, repeated stresses may eventually cause fatigue and cracking of the various elements. As a result of even minor cracking, leakage of the compressed fluid into the exhaust fluid in the recuperator can be a problem in view of the substantial pressure difference between the two fluids. When such leakage occurs, there is a loss to the system of the energy consumed in compressing that portion of the compressor discharge fluid which is lost. It will thus be obvious that a significant amount of leakage can eliminate the increased thermal efficiency which otherwise would be obtained by use of the recuperator as well as causing power loss.

It is an object of this invention to provide for gas turbine powerplants an improved highly efficient recuperator which is substantially free of thermal stresses.

Another object of this invention is to provide an improved recuperative arrangement which is both relatively lightweight and substantially free of thermal stresses.

It is a further object of this invention to provide a recuperative arrangement which has low leakage without having substantial thermal stresses.

A still further object of this invention is to provide a recuperative arrangement which is simple in design and relatively easy and inexpensive to manufacture.

Briefly stated, in accordance with the illustrated embodiments of this invention, a gas turbine powerplant is provided with a heat exchanger, or recuperator, in the passageway connecting the turbine to the powerplant discharge opening. In the recuperator, the exhaust fluid from the turbine is passed in heat exchange relationship with compressed fluid ducted from the discharge portion of the powerplant compressor. From the recuperator, the heated compressed fluid is directed to the inlet portion of the powerplant combustor. First and second toroidal headers surround the engine upstream of the discharge opening, the headers being positioned in radially spaced relationship. First ducting means is connected to the first header and second ducting means is connected to the second header, one of the ducting means communicating at its other end with the discharge portion of the compressor and the other of the ducting means communicating with the inlet portion of the combustor. The first header is supported in position by the first ducting means, which is a rigid supporting means. Axially extending support means connect the first ducting means and the first header to the second header such that the second header is supported axially therefrom the second header providing no support function. The support means permits substantially unrestrained relative radial movement between the first and second headers. A plurality of U-shaped heat exchange tubes join the headers in fluid flow relation and extend downstream into the passageway between the turbine and the powerplant discharge opening.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

FIG. 1 is a pictorial view, partially cut away, of a gas turbine powerplant having a recuperator incorporating this invention;

FIG. 2 is a partial cross-sectional view of the recuperative gas turbine engine illustrated by FIG. 1;

FIG. 3 is a view taken along line 3—3 of FIG. 2 showing one of the radial partitions known as tube support sheets supporting the heat exchange tubes;

FIG. 4 is a fragmentary cross-sectional view of a gas turbine powerplant having a bypass arrangement for selectively directing a portion of the combustion products directly to the discharge opening from the powerplant turbine;

FIG. 5 is a fragmentary cross-sectional view of a gas turbine engine illustrating a second embodiment of support means for supporting the second header relative to the first header; and FIG. 6 is a view illustrating a third embodiment of support means.

FIG. 7 is a top plan view of the structure shown by FIG. 6.

A gas turbine powerplant having a recuperator 10 incorporating one embodiment of this invention is illustrated by FIGS. 1 and 2. The particular powerplant illustrated includes a gas generator 11 comprising a multiple stage axial flow compressor 12, a combustor 13, and a gas generator turbine 14, arranged in axially spaced relation, the rotor of the turbine 14 driving the rotor of the compressor 12 through a hollow axial shaft 15. A power turbine 16 is located axially downstream of the gas generator turbine 14 and drives a load through a shaft 17 coaxially mounted for rotation within the shaft 15. The shaft 17 may, for example, drive a propeller to produce thrust for aircraft propulsion. A discharge opening or exhaust nozzle 22 is spaced axially downstream of the power turbine 16, the discharge opening 22 being connected to the gas generator by a passageway indicated generally by 23, the outer surface of the passageway 23 being defined by an outer exhaust casing 24 and the inner by a diverging conical wall 24a. As this description proceeds, it will become obvious that the gas turbine structure just described is illustrated only and that the invention is equally applicable to other arrangements. For example, the present invention can be utilized with engines of the "turboprop" type as well as the "turboshaft" type just described.

Returning now to the illustrated embodiment, the combustion products discharged from the gas generator turbine 14 into the passageway 23 flow through the power turbine 16 and then are directed by means of axially spaced partitions 30 over the outer surfaces of a large number of axially extending U-shaped heat exchange tubes 31, the flow path of the exhaust fluid through the passageway 23 being shown by arrows in FIGS. 1 and 2. As illustrated by FIG. 3, the radial partitions 30 have openings 32 therein through which the U-shaped tubes 31 are slidably supported. In this manner, the tubes 31 are supported radially while being substantially unrestrained against axial movement. The partitions 30 are comprised of relatively thin flexible material which is capable of flexing to accommodate expansion and contraction due to radial temperature gradients. It will thus be seen that the tubes 31 are supported in properly spaced relationship without being restrained against either axial or radial expansion and contraction. As a result, the tubes 31 are substantially free of thermal stresses during powerplant operation. These tubes 31 will be discussed in greater detail at a later point in this description.

Referring again to FIGS. 1 and 2, one embodiment of the present invention will be described in detail. In the structural arrangement illustrated by FIGS. 1 and 2, an outer toroidal header 35 completely surrounds the powerplant upstream of the discharge opening 22 and the passageway 23. An inner toroidal header 36 similarly surrounds the powerplant, the outer and inner headers 35 and 36, respectively, being axially and radially spaced. As illustrated, the outer diameter of the inner header 36 and the inner diameter of the outer header 35 are substantially in radial alignment, and the inner header 36 is offset axially upstream of the outer header 35. A toroidal extraction frame 37 is located upstream of the headers 35 and 36, the extraction frame 37 surrounding the powerplant radially outward of the combustor 13. The extraction frame 37, a relatively rigid support member, is divided by a circumferential partition 38 into two annular sections 39 and 40. The upstream annular section 39 is connected to the high pressure end of the compressor 12 by a circumferential, diffusing duct 45, and the downstream annular section 40 is connected to the combustor 13 by a duct 46.

A first plurality of tubular ducts 47 connect the downstream annular section 40 of the extraction frame 37 to the inner header 36. The cylindrical ducts 47, which are spaced circumferentially about the powerplant periphery, are rigid and thus support the inner header 36 from the extraction frame 37. A second plurality of tubular ducts 48 extend through the downstream annular section 40 and connect the upstream annular section 39 of the extraction frame 37 to the outer header 35. The ducts 48 are similarly spaced equally about the powerplant periphery and are interposed between adjacent ones of the ducts 47. The ducts 48 do not support the outer header 35; a flexible bellows 49 is provided in each duct 48 to permit free movement of the header 35 relative to the extraction frame 37. Before proceeding with a description of the support arrangement for the outer header 35, it is observed that various members of ducts 47 and 48 may be used; in practice, six of each spaced at 60° intervals have been found to be satisfactory.

The outer header 35 is supported from the inner header 36 by a thin-walled cylindrical member 50 secured to both the outer diameter of the inner header 36 and the inner diameter of the outer header 35. The piston forces exerted on the outer header 36 by the compressed fluid are transmitted from the outer header 35 to the inner header 36 and the support ducts 47 through the member 50. In this manner, it will be seen that the outer header 35 is axially supported from the inner, upstream header 36 by the member 50, the member 50 and the support ducts 47 having sufficient tensile strength to carry the piston forces. These piston forces which must be carried by the member 50 and the support ducts 47 may amount to many thousands of pounds of force. In addition to carrying the piston forces, the member 50 maintains the static radial positioning of the inner and outer headers while, because of its inherent flexibility, permitting substantially unrestrained relative expansion and contraction of the inner and outer headers. For convenience, it may be said that the member or cylinder 50 permits radial expansion and contraction of the outer, downstream header 35, but it will be obvious that the cylinder 50 actually accommodates relative radial movement of both the inner and outer headers. In addition to supporting the outer header 35 axially and positioning it radially, the thin-walled cylinder 50 serves as a seal between the headers to prevent escape of the combustion products flowing through the passageway 23 to the atmosphere. To serve effectively as a seal, the cylinder 50 must be continuously secured to the headers, preferably by brazing or welding. A flexible cylinder 51 joins the outer periphery of the outer header 35 to exhaust casing 24, the cylinder 51 permitting the header 35 to freely expand the contract relative to the exhaust casing 24 while acting as a seal to prevent leakage of the products of combustion.

As discussed above, it is essential that a gas turbine powerplant used for aircraft propulsion be lightweight as well as being substantially free of thermal stresses. In order to achieve a lightweight design, experience dictates that the principal stresses in the structural members, such as the headers and the extraction frame 37, be carried in tension rather than in bending. Accordingly, the headers 35 and 36 and the extraction frame 37 have circular cross-sections to minimize bending loads and therefore permit the use of lightweight, relatively thin-walled materials. To optimize the desired characteristics, it will be obvious to those skilled in the art that the materials selected for the various elements should have high strength and good fatigue characteristics so that the thermal stress relieving capability of the structure described above is not exceeded.

The U-shaped heat exchange tubes 31 are the last elements assembled when fabricating the recuperator 10. With the headers 35 and 36 and the radial partitions 30 in place, each tube 31 is inserted axially from the downstream end of the recuperator 10 through the axially aligned openings 32 in the partitions 30 and into axial openings 52 in the headers. It is essential that the openings 52 be axial in order to make possible this simplified insertion and removal of the tubes 31. The tubes are then brazed to the headers 35 and 36. With the tubes 31 thus restrained at their upstream ends only, they are free to expand and contract axially in response to temperature changes by sliding through the openings 32 in the radial partitions 30. As discussed previously, the partitions 30 are relatively flexible and thus are capable of accommodating radial thermal expansion and contraction of the heat exchange tubes 31 without subjecting the tubes 31 to substantial thermal stresses.

The operation of the recuperator 10 will now be described. Compressed fluid from the high pressure end of the compressor 12 flows through the circumferential duct 45 into the upstream annular section 39 of the extraction frame 37, from which it is delivered through the first plurality of ducts 47 to the outer, downstream header 35. From the toroidal header 35, the compressed fluid enters the U-shaped heat exchange tubes 31 where it is heated by combustion products in the passageway 23 contacting the outer surfaces of the tubes 31. The heated fluid then enters the upstream, inner header 36, from which it is directed through the ducts 48 to the extraction frame 37 and thence to the combustor 13. It may be said that the ducts 47 and the outer header 35 serve as a manifold arrangement for supplying the compressed air from the extraction frame 37 to the tubes 31 and that the inner header 36 and the ducts 48 serve as a manifold arrangement for delivering the compressed air from the tubes 31 to the extraction frame. Following combustion, the high temperature, high pressure products of combustion drive the gas generator turbine 14 and the power turbine 16 prior to being directed by the radial partitions 30 across the outer surfaces of the heat exchange tubes 31 in cross flow heat exchange relationship. The cooled combustion products are then discharged to the atmosphere through the discharge opening 22.

The total weight of a recuperator is also affected by its overall size. It will be noted that the recuperative arrangement illustrated by FIGS. 1–3 directs all of the exhaust fluid through the recuperator 10 under all operating conditions. It is therefore a requirement that the recuperator be large enough to handle the maximum flow rates which occur when the powerplant is operating under full load conditions. This type of powerplant is thus most efficient when operating at full power. During part power operation, both the capacity and weight are greater than required. As a result, the powerplant efficiency is reduced at part power. It is well known, however, that some gas turbine engines are normally run at part power settings. It is therefore sometimes desirable to design the recuperator to provide most efficient operation at part power. A recuperative powerplant utilizing this invention for efficient part power operation is illustrated by FIG. 4.

The powerplant of FIG. 4 is substantially similar to the one illustrated by FIGS. 1–3, similar elements being denoted by the same numerals. The fluid handling elements comprising the recuperator are, however, sized to accommodate only a portion of the full load gas flow. The elements are substantially lighter than the counterpart elements of the powerplant shown by FIGS. 1–3. During part power operation, the entire flow of combustion products passes through a first passageway 60 and contacts the outer surfaces of the heat exchange tubes 31 before being discharged through the opening 22. When the flow of exhaust fluids is greater than can be accommodated through the first exhaust passageway 60, valve plates 61, one of which is illustrated, are moved from the closed positions shown by solid lines in FIG. 4 to the open positions illustrated by broken lines by means of a suitable operating mechanism such as the hydraulic cylinder and piston 62 illustrated. With the valve plates 61 in the open positions, the excess flow at high power settings can be bypassed through a second passageway 63 and discharged through a nozzle 64. This arrangement is thus most efficient at normal part power operation.

Referring now to FIG. 5, a second embodiment of the present invention will be described. As with FIG. 4, unchanged elements are identified in FIG. 5 with the same numerals as in FIGS. 1–3. This second structural arrangement has an outer toroidal header 70 completely surrounding the powerplant upstream of the discharge opening 22 and the passageway 23. An inner toroidal header 71 similarly surrounds the powerplant, the headers 70 and 71 being in axial alignment and radially spaced relationship. As in the first embodiment, a toroidal extraction frame 37 is located upstream of the headers 70 and 71, and the inner header 71 is supported therefrom by a first plurality of tubular ducts 47. A second plurality of tubular ducts 48 flexibly connect the extraction frame 37 and the outer header 70, the outer header 70 being supported from the inner header 71 and the extraction frame 37 by an annular support member 72, which is secured to both headers and has a V-shaped cross-section. The support member 72 is comprised of inner and outer conical-shaped flexible portions 73 and 74, respectively. The inner portion 73 is secured to the outer diameter of the inner header 71 by brazing or welding and diverges radially outward therefrom in the axially downstream direction. The outer portion 74 is similarly secured to the outer header 70, the outer portion 74 converging radially inward therefrom in the axially downstream direction. The flexible portions 73 and 74 are joined at their downstream ends to form the V-shaped support member 72. The axial length of the support member 72 is substantially greater than the radial spacing between the headers, the large piston forces developed on the outer header 70 by the compressed fluid thereby being transmitted through the members 73 and 74 primarily in tension and compression rather than in bending. In this manner, the outer header 70 is axially supported by the inner header 71 in axial alignment with the inner header. In addition, the support member 72 maintains the static radial positioning of the outer and inner headers while, because of the inherent flexibility of the conical-shaped members 73 and 74, permitting substantially unrestrained relative thermal expansion and contraction of the headers. The support member 72 also acts as a seal between the headers.

A third embodiment of the invention is illustrated by FIGS. 6 and 7. In this third structural arrangement, an outer toroidal header 80 and an inner toroidal header 81 circumferentially surround the powerplant, the headers being axially aligned and in radially spaced relationship. The inner header 81 is supported from an extraction frame (not shown) by a first plurality of rigid tubular ducts 82. As illustrated, a portion 82' of each of the ducts 82 is in axial alignment with the outer header 80. A second plurality of tubular ducts 83 flexibly connect the extraction frame to the outer header 80. The outer header 80 is axially supported from the portions 82' of the ducts 82 by axial tie rods 84 which are pivotally connected to both ducts 83 adjacent to the outer header 80 and to the duct portions 82'. The tie rods 84 thus transmit the piston forces from the outer header 80 to the support ducts 82 in tension. The pivotal connections of the axial tie rods 84 permit substantially unrestrained relative expansion and contraction of the headers. A separate sealing arrangement 85 seals the circumferential space between the headers.

From the foregoing, it will be appreciated that the recuperative arrangements of this invention provide relatively lightweight structures which are substantially free of thermal stresses. Therefore, the arrangements make possible the attainment of low leakage and highly efficient operation.

It will be understood that the invention is not limited to the specific details of construction and arrangement of the embodiments illustrated and described herein since changes and modifications will be obvious to those skilled in the art. For example, other arrangements for interconnecting the headers may be utilized. Radial abutting surfaces may be used to transmit the piston forces without preventing relative radial movement. Similarly, cylindrical, overlapping plates joined by slidable radial pins can be used to interconnect the headers. It will also occur to thoes skilled in the art that the extraction frame 37 could be eliminated and that the ducts could directly connect the headers to the discharge portion of the compressor 12 and the combustor 13. Similarly, other embodiments as well as the first embodiment of the invention may be used in conjunction with a bypass arrangement of the type illustrated by FIG. 4. It is therefore intended to cover in the appended claims all such changes and modifications which may occur to those skilled in the art without departing from the true spirit and scope of the invention.

What is claimed as new and desired to secure by Letters Patent of the United States is:

1. In a gas turbine powerplant having in axially spaced relationship a fluid compressor, a combustor, a turbine drivingly connected to said compressor, a discharge opening, and a passageway connecting said turbine to said discharge opening, a recuperator comprising, in combination:
   (a) first manifold means comprising a first toroidal header and first ducting means in fluid flow relationship,
   (b) second manifold means comprising a second toroidal header and second ducting means in fluid flow relationship,
   (c) one of said first and second ducting means communicating with the discharge portion of the compressor and the other ducting means communicating with the inlet portion of the combustor,
   (d) said first ducting means secured to said first header such that said first header is supported by said first ducting means, and said second manifold means including flexible means such that second header is substantially unsupported by said second ducting means,
   (e) axially extending support means connecting said first manifold means and said second header such that said second header is supported axially by said first manifold means, said support means permitting substantially unrestrained radial expansion and contraction of said second header,
   (f) and a plurality of heat exchange elements connecting said first and second headers in fluid flow relation, said heat exchange elements extending into the passageway between the turbine and the discharge opening in heat exchange relation to combustion products flowing therethrough,
   (g) whereby fluid supplied to said heat exchange elements from the compressor is heated by the combustion products prior to being delivered to the combustor.

2. In a gas turbine powerplant having in axially spaced relationship a fluid compressor, a combustor, a turbine drivingly connected to said compressor, a discharge opening, and a passageway connecting said turbine to said discharge opening, a recuperator comprising, in combination:
   (a) first manifold means comprising a first toroidal header positioned axially upstream of the discharge opening and first ducting means connected to said first header,
   (b) second manifold means comprising a second toroidal header positioned axially upstream of the discharge opening and second ducting means connected to said second header, said second header in radially spaced relationship to said first header,
   (c) one of said first and second ducting means communicating with the discharge portion of the compressor and the other ducting means communicating with the inlet portion of the combustor,
   (d) said first ducting means secured to said first header such that said first header is supported by said first ducting means, and said second manifold means including flexible means such that said second header is substantially unsupported by said second ducting means,
   (e) axially extending support means connecting said first manifold means and said second header such that said second header is supported axially by said first manifold means, said support means permitting substantially unrestrained radial expansion and contraction of said second header,
   (f) and a plurality of heat exchange tubes fixed to and connecting said first and second headers in fluid flow relation, said heat exchange tubes being U-shaped and extending axially downstream from said headers into the passageway between the turbine and the discharge opening in heat exchange relation to combustion products flowing therethrough,
   (g) whereby fluid supplied to said heat exchange tubes from the compressor is heated by the combustion products prior to being delivered to the combustor.

3. In a gas turbine powerplant having in axially spaced relationship a fluid compressor, a combustor, a turbine drivingly connected to said compressor, a discharge opening, and a passageway connecting said turbine to said discharge opening, a recuperator comprising, in combination:
   (a) a first toroidal header having circular cross-section positioned axially upstream of the discharge opening,
   (b) a second toroidal header having circular cross-section positioned axially upstream of the discharge opening and in radially spaced relationship to said first header,
   (c) a first set of tubular ducts connected to said first header,
   (d) a second set of tubular ducts connected to said second header,
   (e) one of said sets of tubular ducts communicating with the discharge portion of the compressor and the other set of ducts communicating with the inlet portion of the combustor,
   (f) said first set of ducts supporting said first header, and said second set of ducts including flexible means such that said second header is substantially unsupported by said second set of ducts,
   (g) a plurality of axially extending tie rods connecting said first set of tubular ducts and said second set of tubular ducts adjacent said second header to support axially said second header downstream of said first set of ducts,
   (h) said axially extending tie rods pivotally connected to said first set of ducts and said second set of ducts so as to permit substantially unrestrained radial expansion and contraction of said second header,
   (i) and a plurality of heat exchange tubes fixed to and connecting said first and second headers in fluid flow relation, said heat exchange tubes being U-shaped and extending axially downstream from said headers into the passageway between the turbine and the discharge opening in heat exchange relation to combustion products flowing therethrough,
   (j) whereby fluid supplied to said heat exchange tubes from the compressor is heated by the combustion products prior to being delivered to the combustor.

4. In a gas turbine powerplant having in axially spaced relationship a fluid compressor, a combustor, a turbine drivingly connected to said compressor, a discharge opening, and a passageway connecting said turbine to said discharge opening, a recuperator comprising, in combination:
   (a) a first toroidal header having circular cross-section positioned axially upstream of the discharge opening,
   (b) a second toroidal header having circular cross-section positioned axially upstream of the discharge opening,
   (c) said first and second headers in axial and radial spaced rationship, the radial relationship being such that the inner diameter of the outer header and the outer diameter of the inner header are substantially in radial alignment,
   (d) a first set of tubular ducts connected to the upstream header,
   (e) a second set of tubular ducts connected to the downstream header,
   (f) one of said sets of tubular ducts communicating with the discharge portion of the compressor and the other set of ducts communicating with the inlet portion of the combustor, said first set of ducts supporting the upstream header, and said second set of ducts including flexible means such that said downstream header is substantially unsupported by said second set of ducts, (g) a relatively flexible thin-walled cylinder tangentially secured to the outer header at its inner diameter and the inner header at its outer diameter such that the downstream header is axially supported from the upstream header, (h) said relatively flexible thin-walled cylinder permitting substantially unrestrained radial expansion and contraction of the downstream header, (i) and a plurality of heat exchange tubes fixed to and connecting said first and second headers in fluid flow relation, said heat exchange tubes being U-shaped and extending axially downstream from said headers into the passageway between the turbine and the discharge opening in heat exchange relation to combustion products flowing therethrough, (j) whereby fluid supplied to said heat exchange elements from the compressor is heated by the combustion products prior to being delivered to the combustor.

5. In a gas turbine powerplant having in axially spaced relationship a fluid compressor, a combustor, a turbine drivingly connected to said compressor, a discharge opening, and a passageway connecting said turbine to said discharge opening, a recuperator comprising, in combination:

(a) a first toroidal header having circular cross-section positioned axially upstream of the discharge opening, (b) a second torodial header having circular cross-section axially aligned with and radially spaced from said first header, (c) a first set of tubular ducts connected to said first header, (d) a second set of tubular ducts connected to said second header, (e) one of said sets of tubular ducts communicating with the discharge portion of the compressor and the other set of ducts communicating with the inlet portion of the combustor, (f) said first set of ducts supporting said first header, and said second set of ducts including flexible means such that second header is substantially unsupported by said second set of ducts, (g) an annular support member having V-shaped cross-section secured to said headers and axially supporting said second header from said first header, (h) said annular support member comprising inner and outer substantially conical-shaped flexible members secured to said inner and outer headers, respectively, and extending axially downstream therefrom said inner member diverging radially outward and said outer member converging radially inward in the axially downstream direction, said inner and outer members being joined at their downstream ends, (i) the axial length of said annular support member being greater than the radial spacing between said inner and outer headers, (j) said flexible inner and outer members permitting substantially unrestrained radial expansion and contraction of said second header, (k) and a plurality of heat exchange tubes fixed to and connecting said first and second headers in fluid flow relation, said heat exchange elements being U-shaped and extending axially downstream from said headers into the passageway between the turbine and the discharge opening in heat exchange relation to combustion products flowing therethrough, (l) whereby fluid supplied to said heat exchange elements from the compressor is heated by the combustion products prior to being delivered to the combustor.

6. In a gas turbine powerplant having in axially spaced relationship a fluid compressor, a combustor, a turbine drivingly connected to said compressor, a discharge opening, and a passageway connecting said turbine to said discharge opening, a recuperator comprising, in combination:

(a) first manifold means comprising a first toroidal header positioned axially upstream of the discharge opening and first ducting means connected to said first header, (b) second manifold means comprising a second toroidal header positioned axially upstream of the discharge opening, and second ducting means including an expansible bellows, (c) one of said first and second ducting means communicating with the discharge portion of the compressor and the other ducting means communicating with the inlet portion of the combustor, (d) said first ducting means secured to said first header such that said first header is supported by said first ducting means, (e) axially extending support means connecting said first manifold means and said second header such that said second header is supported axially by said first manifold means, said support means permitting substantially unrestrained radial expansion and contraction of said second header, (f) and a plurality of heat exchange tubes fixed to and connecting said first and second headers in fluid flow relation, said heat exchange tubes being U-shaped and extending axially downstream from said headers into the passageway between the turbine and the discharge opening in heat exchange relation to combustion products flowing therethrough, (g) whereby fluid supplied to said heat exchange tubes from the compressor is heated by the combustion products prior to being delivered to the combustor.

7. In a gas turbine powerplant having in axially spaced relationship a fluid compressor, a combustor, a turbine drivingly connected to said compressor, a discharge opening, and a passageway connecting said turbine to said discharge opening, a recuperator comprising, in combination:

(a) first manifold means comprising a first toroidal header positioned axially upstream of the discharge opening and first ducting means connected to said first header, (b) second manifold means comprising a second toroidal header positioned axially upstream of the discharge opening and second ducting means including an expansible bellows, (c) one of said first and second ducting means communicating with the discharge portion of the compressor and the other ducting means communicating with the inlet portion of the combustor, (d) said first ducting means secured to said first header such that said first header is supported by said first ducting means, (e) axially extending support means connecting said first manifold means and said second header such that said second header is supported axially by said first manifold means, said support means permitting substantially unrestrained radial expansion and contraction of said second header, (f) and a plurality of heat exchange tubes fixed to and connecting said first and second headers in fluid flow relation, said heat exchange tubes being U-shaped and extending axially downstream from said headers into the passageway between the turbine and the discharge opening in heat exchange relation to combustion products flowing therethrough, (g) and supplemental support means in said passageway between the turbine and the discharge opening radially supporting said heat exchange tubes and permitting substantially unrestrained axial expansion and contraction of said heat exchange tubes, (h) whereby fluid supplied to said heat exchange tubes from the compressor is heated by the combustion products prior to being delivered to the combustor.

8. A recuperative gas turbine powerplant comprising, in combination:
(a) a gas generator having in axially spaced relationship a compressor, a combustor, and a turbine drivingly connected to said compressor,
(b) a discharge opening,
(c) first and second passageways connecting said turbine to said discharge opening,
(d) a valve for selectively permitting or preventing flow of combustion products through said second passageway,
(e) first manifold means comprising a first toroidal header positioned axially upstream of said discharge opening and first ducting means connected to said first header,
(f) second manifold means comprising a second toroidal header positioned axially upstream of said discharge opening and second ducting means connected to said second header, said second header in radially spaced relationship to said first header,
(g) one of said first and second ducting means communicating with the discharge portion of said compressor and the other ducting means communicating with the inlet portion of said combustor,
(h) said first ducting means secured to said first header such that said first header is supported by said first ducting means, and said second manifold means including flexible means such that said second header is substantially unsupported by said second ducting means,
(i) axially extending support means connecting said first manifold means and said second header such that said second header is supported axially by said first manifold means, said support means permitting substantially unrestrained radial expansion and contraction of said second header,
(j) and a plurality of heat exchange tubes fixed to and connecting said first and second headers in fluid flow relation, said heat exchange elements being U-shaped and extending axially downstream from said headers into said first passageway between the turbine and the discharge opening in heat exchange relation to combustion products flowing therethrough,
(k) whereby fluid supplied to said heat exchange elements from the compressor is heated by the combustion products flowing through said first passageway prior to being delivered to the combustor.

9. A recuperative gas turbine powerplant comprising, in combination:
(a) a gas generator having in axially spaced relationship a compressor, a combustor, and a turbine drivingly connected to said compressor,
(b) a discharge opening,
(c) first and second passageways connecting said turbine to said discharge opening,
(d) a valve for selectively permitting or preventing flow of combustion products through said second passageway,
(e) first manifold means comprising a first toroidal header positioned axially upstream of the discharge opening and first ducting means connected to said first header,
(f) second manifold means comprising a second toroidal header positioned axially upstream of the discharge opening and second ducting means including an expansible bellows,
(g) one of said first and second ducting means communicating with the discharge portion of the compressor and the other ducting means communicating with the inlet portion of the combustor,
(h) said first ducting means secured to said first header such that said first header is supported by said first ducting means,
(i) axially extending support means connecting said first manifold means and said second header such that said second header is supported axially by said first manifold means, said support means permitting substantially unrestrained radial expansion and contraction of said second header,
(j) a plurality of heat exchange tubes fixed to and connecting said first and second headers in fluid flow relation, said heat exchange elements being U-shaped and extending axially downstream from said headers into said first passageway between the turbine and the discharge opening in heat exchange relation to combustion products flowing therethrough,
(k) supplemental support means in said first passageway between the turbine and the discharge opening radially supporting said heat exchange tubes and permitting substantially unrestrained axial expansion and contraction of said heat exchange tubes,
(l) whereby fluid supplied to said heat exchange elements from the compressor is heated by the combustion products flowing through said first passageway prior to being delivered to the combustor.

10. A recuperative gas turbine powerplant comprising, in combination:
(a) a gas generator having in axially spaced relationship a compressor, a combustor, and a turbine drivingly connected to said compressor,
(b) a discharge opening,
(c) first and second passageways connecting said turbine to said discharge opening,
(d) a valve for selectively permitting or preventing flow of combustion products through said second passageway,
(e) a first toroidal header having circular cross-section positioned axially upstream of the discharge opening,
(f) a second toroidal header having circular cross-section positioned axially upstream of the discharge opening and in radially spaced relationship to said first header,
(g) a first set of tubular ducts connected to said first header,
(h) a second set of tubular ducts each including an expansible bellows,
(i) said second set of tubular ducts communicating with the discharge portion of said compressor and said first set of tubular ducts communicating with the inlet portion of said combustor,
(j) said first set of ducts supporting said first header,
(k) a plurality of axially extending tie rods connecting said first set of tubular ducts and said second set of tubular ducts adjacent said second header to support axially said second header downstream of said first set of ducts,
(l) said axially extending tie rods pivotally connected to said first set of ducts and said second set of ducts so as to permit substantially unrestrained radial expansion and contraction of said second header,
(m) a plurality of heat exchange tubes fixed to and connecting said first and second headers in fluid flow relation, said heat exchange elements being U-shaped and extending axially downstream from said headers into said first passageway between the turbine and the discharge opening in heat exchange relation to combustion products flowing therethrough,
(n) and at least one relatively thin flexible partition radially traversing said first passageway, said partition having a plurality of openings therein slidably receiving said heat exchange tubes so as to radially support said tubes and permit substantially unrestrained axial expansion and contraction of said tubes, (o) whereby fluid supplied to said heat exchange elements from the compressor is heated by the combustion products flowing through said first passageway prior to being delivered to the combustor.

11. A recuperative gas turbine powerplant comprising, in combination:
(a) a gas generator having in axially spaced relationship a compressor, a combustor, and a turbine drivingly connected to said compressor,
(b) a discharge opening,
(c) first and second passageways connecting said turbine to said discharge opening,
(d) a valve for selectively permitting or preventing flow of combustion products through said second passageway,
(e) a first toroidal header having circular cross-section positioned axially upstream of the discharge opening,
(f) a second toroidal header having circular cross-section positioned axially upstream of the discharge opening,
(g) said first and second headers in axial and radial spaced relationship, the radial relationship being such that the inner diameter of the outer header and the outer diameter of the inner header are substantially in radial alignment,
(h) a first set of tubular ducts connected to the upstream header,
(i) a second set of tubular ducts each including an expansible bellows,
(j) said second set of tubular ducts communicating with the discharge portion of said compressor and said first set of tubular ducts communicating with the inlet portion of said combustor,
(k) said first set of ducts supporting the upstream header,
(l) a relatively flexible thin-walled cylinder tangentially secured to the outer header at its inner diameter and the inner header at its outer diameter such that the downstream header is axially supported from the upstream header,
(m) said relatively flexible thin-walled cylinder permitting substantially unrestrained radial expansion and contraction of the downstream header,
(n) a plurality of heat exchange tubes fixed to and connecting said first and second headers in fluid flow relation, said heat exchange elements being U-shaped and extending axially downstream from said headers into said first passageway between the turbine and the discharge opening in heat exchange relation to combustion products flowing therethrough,
(o) and at least one relatively thin flexible partition radially traversing said first passageway, said partition having a plurality of openings therein slidably receiving said heat exchange tubes so as to radially support said tubes and permit substantially unrestrained axial expansion and contraction of said tubes,
(p) whereby fluid supplied to said heat exchange elements from the compressor is heated by the combustion products flowing through said first passageway prior to being delivered to the combustor.

12. A recuperative gas turbine powerplant comprising, in combination:
(a) a gas generator having in axially spaced relationship a compressor, a combustor, and a turbine drivingly connected to said compressor,
(b) a discharge opening,
(c) first and second passageways connecting said turbine to said discharge opening,
(d) a valve for selectively permitting or preventing flow of combustion products through said second passageway,
(e) a first toroidal header having circular cross-section positioned axially upstream of the discharge opening,
(f) a second toroidal header having circular cross-section axially aligned with and radially spaced from said first header,
(g) a first set of tubular ducts connected to said first header,
(h) a second set of tubular ducts each including an expansible bellows,
(i) said second set of tubular ducts communicating with the discharge portion of said compressors and said first set of tubular ducts communicating with the inlet portion of said combustor,
(j) said first set of ducts supporting said first header,
(k) an annular support member having a V-shaped cross-section secured to said headers and axially supporting said second header from said first header,
(l) said annular support member comprising inner and outer substantially conical-shaped flexible members secured to said inner and outer headers, respectively, and extending axially downstream therefrom said inner member diverging radially outward and said outer member converging radially inward in the axially downstream direction, said inner and outer members being joined at their downstream ends,
(m) the axial length of said annular support member being greater than the radial spacing between said inner and outer headers,
(n) said flexible inner and outer members permitting substantially unrestrained radial expansion and contraction of said second header,
(o) a plurality of heat exchange tubes fixed to and connecting said first and second headers in fluid flow relation, said heat exchange elements being U-shaped and extending axially downstream from said headers into said first passageway between the turbine and the discharge opening in heat exchange relation to combustion products flowing therethrough,
(p) and at least one relatively thin flexible partition radially traversing said first passageway, said partition having a plurality of openings therein slidably receiving said heat exchange tubes so as to radially support said tubes and permit substantially unrestrained axial expansion and contraction of said tubes,
(q) whereby fluid supplied to said heat exchange elements from the compressor is heated by the combustion products flowing through said first passageway prior to being delivered to the combustor.

References Cited by the Examiner
UNITED STATES PATENTS
3,177,928    4/1965    Tumavicus _____ 60—39.51 X FOREIGN PATENTS
760,803    11/1956    Great Britain.

MARK NEWMAN, Primary Examiner.
R. D. BLAKESLEE, Assistant Examiner.